(12) United States Patent
Kohn et al.

(10) Patent No.: US 10,119,846 B2
(45) Date of Patent: Nov. 6, 2018

(54) METHOD, SENSOR MODULE, AND SYSTEM FOR TRANSFERRING DATA

(75) Inventors: Oliver Kohn, Reutlingen (DE); Daniel Schifferdecker, Tuebingen (DE); Thomas Claus, Tuebingen (DE); Hans-Peter Waible, Flein (DE); Anton Roman Grad, Stephanskirchen (DE); Fouad Bennini, Reutlingen (DE); Julian Bartholomeyczik, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 385 days.

(21) Appl. No.: 13/991,520

(22) PCT Filed: Nov. 3, 2011

(86) PCT No.: PCT/EP2011/069283
§ 371 (c)(1),
(2), (4) Date: Aug. 23, 2013

(87) PCT Pub. No.: WO2012/076261
PCT Pub. Date: Jun. 14, 2012

(65) Prior Publication Data
US 2013/0321167 A1 Dec. 5, 2013

(30) Foreign Application Priority Data
Dec. 7, 2010 (DE) ........................ 10 2010 062 567

(51) Int. Cl.
*G01D 9/00* (2006.01)
*G06F 5/10* (2006.01)

(52) U.S. Cl.
CPC *G01D 9/00* (2013.01); *G06F 5/10* (2013.01)

(58) Field of Classification Search
CPC ............. G06K 7/0008; G06K 19/0723; G06K 19/07749; G06K 17/00; G08B 13/2417
USPC .......................... 340/10.1–10.6, 572.1–572.9
See application file for complete search history.

(56) References Cited

U.S. PATENT DOCUMENTS

| 2007/0032930 A1 | 2/2007 | Ozawa |
| 2009/0234200 A1* | 9/2009 | Husheer ............... A61B 5/0008 600/301 |

FOREIGN PATENT DOCUMENTS

| CN | 1485750 A | 3/2004 |
| CN | 101763328 A | 6/2010 |
| DE | 10 2009 001 617 | 9/2010 |

OTHER PUBLICATIONS

International Search Report for PCT/EP2011/069283, dated Feb. 23, 2012.

* cited by examiner

*Primary Examiner* — James J Yang
(74) *Attorney, Agent, or Firm* — Norton Rose Fulbright US LLP; Gerard Messina

(57) ABSTRACT

In a method for transmitting a data element from a sensor module that produces sensor data to an application unit, the data element is stored in a ring buffer in the sensor module, and a corresponding item of event information is produced in an evaluation circuit from the sensor data, the data element including the sensor data and the item of event information, the data element being transmitted from the ring buffer to the application unit upon request by the application unit.

10 Claims, 3 Drawing Sheets

METHOD, SENSOR MODULE, AND SYSTEM FOR TRANSFERRING DATA

BACKGROUND OF THE INVENTION

1. Field of the Invention

The present invention relates to a method for transferring data from a sensor module.

2. Description of the Related Art

From the published German patent application document DE 102009001617 A1, there is known a sensor module for a vehicle safety system, as well as a method for actuating such a sensor module for a vehicle safety system, data being sent wirelessly by at least one transmitter of the sensor module as a function of a sensor signal. The sensor signal is transmitted to an analog-digital converter inside or outside a microcontroller for the digitization of the sensor signal. The microcontroller stores the digitized sensor signals in a ring buffer, and, using radio signals, transmits the data from the ring buffer via a transceiver to a further transceiver of a control device when this is indicated by vehicle quantities, such as vehicle speed, and/or events such as a blockage of the wheels or slippage.

In conventional sensor systems having a sensor element, an evaluation switch (ASIC), and an application unit (μC), so-called interrupts are used to control events. Here, the data processing of e.g. acceleration or rotational rate signals is carried out in the evaluation circuit, and when particular conditions occur an interrupt is given to the application unit. This interrupt takes place via an interrupt output, provided for this purpose, on the sensor element or on the evaluation circuit. The application unit is awakened by the interrupt and starts the reading out of the sensor data. The calculation of the interrupts in the evaluation circuit instead of in the application unit makes possible a power savings, so that the application unit can be used for other tasks (instead of a very frequent reading out of the sensor data even though e.g. no movement is taking place). Through the use of a ring buffer (first-in-first-out buffer) in the evaluation circuit, it is possible for the application unit to read out the sensor data in the ring buffer with a comparatively low data rate, in packet-by-packet fashion. If, for example, an interrupt is produced (triggered) and the application unit awakens, it is often the case that both the sensor data before the interrupt event and the sensor data after the interrupt event are of interest. For this purpose, it is conventionally disadvantageously necessary that the sensor data stored in the ring buffer must additionally again be evaluated by the application unit.

BRIEF SUMMARY OF THE INVENTION

The method according to the present invention, the sensor module according to the present invention, and the system according to the present invention have, in contrast to the existing art, the advantage that the items of interrupt and/or event information are transmitted to the application unit in addition to the sensor data, so that an additional evaluation of the sensor data by the application unit is no longer necessary, so that, advantageously, the computing time of the application unit can be reduced, so that a comparatively significant energy savings can be achieved. Thus, it is for example advantageously possible for the items of event information only to be added by the application unit, and calculations of the application unit can largely be omitted.

The advantages of the present invention are achieved by a method for transmitting a data element from a sensor module that produces sensor data to an application unit, the data element being stored in a ring buffer in the sensor module, and a corresponding item of event information being produced in an evaluation circuit from the sensor data, the data element including the sensor data and the item of event information, the data element being transmitted from the ring buffer to the application unit upon request by the application unit.

In the present context, a sensor module is to be understood as a constructive unit such as a rotational speed sensor, an acceleration sensor, a rotational rate sensor, an air pressure sensor, a magnetic sensor, or a structure-borne sound sensor. The sensor module can include the actual sensor element and, standardly, also an ASIC, an application-specific integrated circuit, or can include a programmable module such as a microcontroller or microprocessor that carries out a pre-processing of the sensor signals. The sensor module here is a sealed constructive unit. Only connection means to the location of installation are provided.

The data element is for example data telegrams in which the actual sensor values are housed. The sensor signal represents the sensor values outputted by the sensor element. In addition to the useful data, for example the sensor values, this data telegram can also include further data such as identification data or additional data for error correction. According to the present invention, the data element has, in addition to the sensor values, an item of event information. This item of event information is for example an item of information concerning the triggered sensor axis, the sign of the acceleration, the type of an interrupt (e.g. portrait/landscape changeover, shake, pedometer step number), the type of exceeded threshold, and/or tip/tiptap/3x tip.

A ring buffer (corresponding to a first-in-first-out, or FIFO, buffer) is understood here as a buffer that continuously stores data in a particular time period, and overwrites these data after the expiration of a specified time in order to make storage space available for new data.

It is further advantageous that the ring buffer and the ASIC are situated on an integrated circuit. This enables a compact construction and reduces the space requirement of the sensor module. The reliability can also be increased in this way.

According to a preferred development, it is provided that the data element has a first data word length, the sensor data having a second data word length, the first data word length being greater than the second data word length, and the word length difference between the first data word length and the second data word length being used for the storage of the item of event information. In conventional 16-bit sensors, the first data word length is, correspondingly, 16 bits. If for example only 8 bits or 12 bits are required for the transfer of the sensor data, the word length difference is 8 bits or 4 bits, so that this word length difference can be used for the transmission of 8 bits or 4 bits of the item of event information. In this way, it is advantageously possible for items of event information to be transmitted without having to increase the data word length.

According to another preferred development, it is provided that a multiplicity of data elements are stored in the ring buffer, the sensor data and the items of event information of each individual data element corresponding to a common time of production. Sensor data and corresponding items of event information are produced at different times. These time-related items of information are stored in a data element. Through the production of temporally successive items of information, or data elements, a history of items of event information can be stored in the ring buffer. In addition, it is preferred that the multiplicity of data elements be transmitted from the ring buffer to the application unit. In this way, it is advantageously possible for the application unit, for example after an interrupt, to access items of event information before and after the interrupt.

According to a further preferred development, it is provided that the sensor data are evaluated in the sensor module by an integrated circuit for event information. In this way, a comparatively simple production of the event information is advantageously possible.

According to another preferred development, it is provided that the ring buffer is operated in at least two operating modes, and a selection between the two operating modes is made upon request by the application unit. Thus, it is for example possible either for no data elements to be stored any longer in the ring buffer when the ring buffer is full, or for the oldest data element to be overwritten by the youngest data element. In this way, a use of the ring buffer that meets current needs is advantageously possible.

A further subject matter of the present invention relates to a sensor module having a ring buffer for storing a data element, a corresponding item of event information being capable of being produced in an evaluation circuit from sensor data, the data element including the sensor data and the item of event information, and the data element being capable of being transmitted from the ring buffer to an application unit upon request by the application unit. In this way, it is advantageously possible for the items of interrupt information and/or items of event information to be transmitted to the application unit in addition to the sensor data, so that an additional evaluation of the sensor data by the application unit is no longer required; in this way, the computing time of the application unit can advantageously be reduced, so that a comparatively significant savings of energy can be achieved.

A further subject matter of the present invention relates to a system having a sensor module and an application unit, the sensor module having a ring buffer for storing a data element, a corresponding item of event information being capable of being produced in an evaluation circuit from sensor data, the data element including the sensor data and the item of event information, and the data element being capable of being transmitted from the ring buffer to the application unit upon request by the application unit. In this way, it is advantageously possible for the items of interrupt information and/or of event information to be transmitted to the application unit in addition to the sensor data, so that an additional evaluation of the sensor data by the application unit is no longer necessary; in this way, the computing time of the application unit can advantageously be reduced so that a comparatively significant savings of energy can be achieved.

DETAILED DESCRIPTION OF THE DRAWINGS

DETAILED DESCRIPTION OF THE INVENTION

Figure 1:
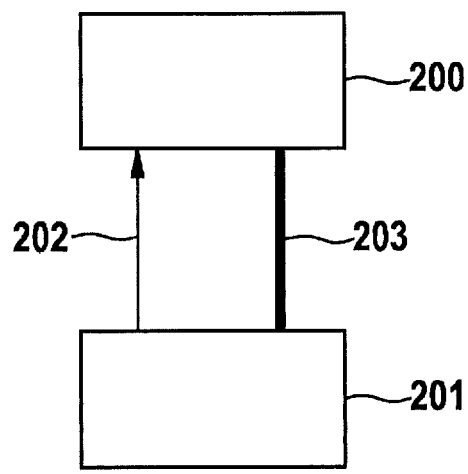
FIG. 1 shows a system according to an exemplary specific embodiment of the present invention.

In the various Figures, identical parts have always been provided with the same reference characters, and are therefore as a rule each named or mentioned only once.

FIG. 1 shows a sensor system according to an exemplary specific embodiment of the present invention. The sensor system has an application unit (μC) 200 and a sensor module 201. The sensor module has a sensor element (e.g. an acceleration sensor) and an evaluation circuit (ASIC). In the evaluation circuit ASIC, sensor data such as for example acceleration values are processed to form items of event information. In addition, sensor module 201 has a ring buffer (first-in-first-out buffer) in which according to the present invention data elements are stored that contain both sensor data and items of event information. For example when a particular event occurs, sensor module 201 transmits interrupts to application unit 200 via an interrupt connection 202. In addition, sensor module 201 transmits the data elements to application unit 200 via data connection 203. According to the present invention, via data connection 203 data elements are transmitted from sensor module 201 to application unit 200, these data elements containing both sensor data such as e.g. acceleration values and also items of event information.

Figure 2A:
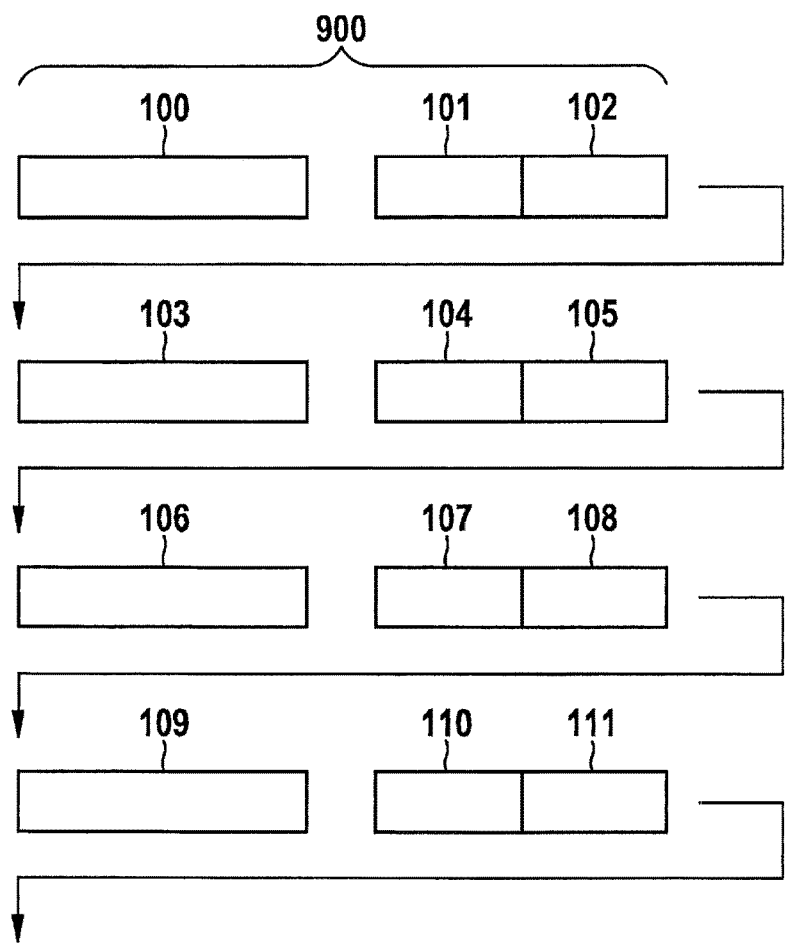
FIGS. 2a and 2b show data elements for carrying out the method according to the present invention.

FIG. 2a shows data elements 900 for carrying out the method according to the present invention. These data elements 900 are transmitted from sensor module 201 to application unit 200. In this exemplary embodiment, the data elements are transmitted in 2 times 8 bit values, an MSP (most significant byte) and an LSP (least significant byte) being transmitted. Of these 16 bits, according to the present invention 12 bits are used for the transmission of the sensor data (for example measured acceleration values), and 4 bits are used for the transmission of items of event information. Data elements 100, 101, 102 are for example data elements of the X1 channel of a three-channel rotational rate sensor. Data elements 103, 104, 105 are for example data elements of the Y1 channel. Data elements 106, 107, 108 are for example data elements of the Z1 channel. Data elements 109, 110, 111 are for example data elements of the X2 channel of a three-channel rotational rate sensor, etc. Data elements 100, 103, 106, 109 contain bits 0 . . . 7 of the MSB (most significant byte), which contains the measured sensor data. First data subelements 101, 104, 107, 110 contain bits 8 . . . 11 of the LSB (least significant byte), which contains the measured sensor data. Second data subelements 102, 105, 108, 111 contains four bits that according to the present invention characterize the item of event information. The items of event information include for example items of information relating to the triggering or triggered sensor axis, the sign of the measured acceleration value, the type of interrupt (AnyMotion, portrait/landscape, shake, pedometer step number, etc.), the exceeded (acceleration) threshold, tips and/or tip taps, or newly measured data. Through the method according to the present invention, the transmission of the items of event information to application unit 200 is possible without increasing the data length in bits. In addition, it is advantageously possible for the history of the (interrupt) events to be reproduced in application unit 200, and for the events to be processed directly in application unit 200. In this way, application unit 200 can assign which events have occurred before and after an interrupt, e.g. in case application unit 200 was in a sleep phase during the interrupt. In addition, the computing outlay in application unit 200 is advantageously reduced, because the application unit does not have to read out any additional sensor status registers, and it is automatically always ensured that the sensor data are synchronized with the events, or with the interrupts.

In the following, an example of the functioning of the ring buffer is described. The ring buffer is a data storage device that temporarily contains data while they are moved from one location to another. The ring buffer is used to discharge bus traffic between sensor module 200 and application unit 201. Instead of the constant reading out of sensor data, application unit 201 periodically receives data blocks with data stored in sensor module 200. This results in a reduction of energy consumption, because application unit 201 can e.g. change over into sleep mode between the block-by-block reading of the sensor data. The ring buffer can be used in four operating modes. In the first operating mode (so-called bypass mode), only the first address of the ring buffer is updated and overwritten; therefore, in the first operating mode the ring buffer is not active. In the second operating mode (so-called FIFO mode), sensor data and, optionally, interrupt data are stored in the ring buffer. A "water level interrupt" can be activated that is produced when the ring buffer is filled up to a configurable level. The ring buffer is continuously filled up to the last slot; when the ring buffer is full, the data collection is stopped. The third operating mode (stream mode) is similar to the second operating mode, but there is a difference: when the ring buffer is full, the first (oldest) frame is deleted, and the data collection continues. In the fourth operating mode (stream-to-FIFO mode), the data storage changes over from the third operating mode to the second operating mode as a function of an event. This fourth operating mode is used when the sensor data are to remain stored and called by an application circuit.

Figure 2B:
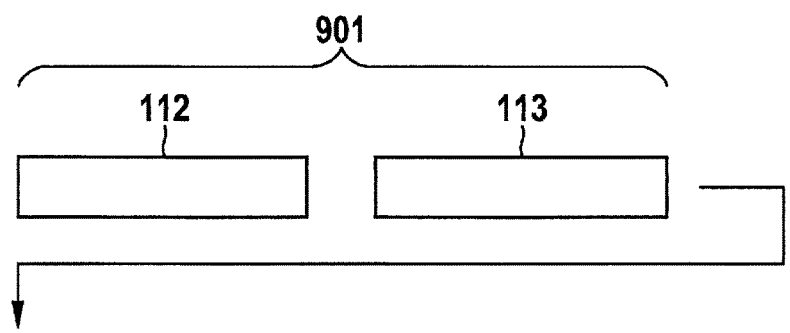

FIG. 2b shows data elements 901 for carrying out the method according to the present invention according to a further specific embodiment. Data elements 112, 113 are for example data elements of the X1 channel of a three-channel rotational rate sensor. Data element 112 has 8 bits in which the sensor data are stored. Data element 113 has 8 bits in which the item(s) of event information are stored. In this specific embodiment, therefore, in comparison to the specific embodiment shown in FIG. 2a, not merely 4 bits, but rather 8 bits are used for the transmission of the items of event information. Alternatively or optionally, a changeover mode is provided with which a changeover can take place between the transmission of more sensor data and fewer items of event information, or the transmission of fewer sensor data and more items of event information.

Figure 3:
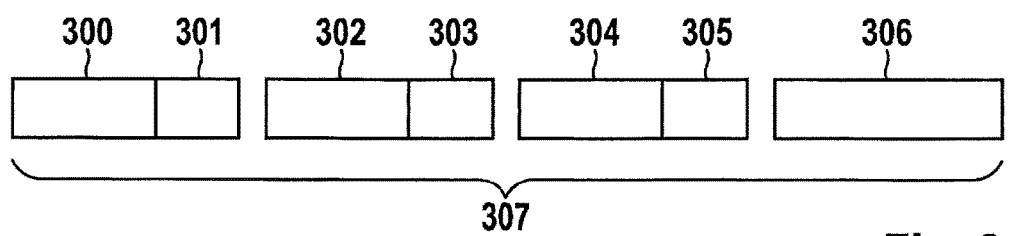
FIG. 3 shows data elements for carrying out the method according to the present invention.

FIG. 3 shows data elements 307 according to a further specific embodiment for carrying out the method according to the present invention. A data element (frame) 307 has data subelements 300, 301, 302, 303, 304, 305, 306. Data subelement 300 has for example the MSB of the measured acceleration values along the x axis of an acceleration sensor. Data subelement 301 has for example the LSB of the measured acceleration values along the x axis of the acceleration sensor. Data subelement 302 has for example the MSB of the measured acceleration values along the y axis of the acceleration sensor. Data subelement 303 has for example the LSB of the measured acceleration values along the y axis of the acceleration sensor. Data subelement 304 has for example the MSB of the measured acceleration values along the z axis of the acceleration sensor. Data subelement 305 has for example the LSB of the measured acceleration values along the z axis of the acceleration sensor. Data subelement 306 has items of event information according to the present invention. These are for example interrupt status bits.

What is claimed is:

1. A method for transmitting at least one data element from a sensor module to an application unit, comprising:
    producing, by the sensor module, sensor data;
    producing, in an evaluation circuit, a corresponding item of event information from the sensor data;
    storing a data element in a ring buffer in the sensor module, the data element including the sensor data and the item of event information; and
    transmitting the data element from the ring buffer to the application unit upon request by the application unit,
        wherein the data element has a first data word length, the sensor data having a second data word length, the first data word length being larger than the second data word length,
        wherein the item of event information has a third word length,
        wherein the third word length is a difference between the first data word length and the second data word length, and
        wherein the item of event information includes at least one of an item of information concerning a triggered sensor axis, a type of an interrupt, and a type of exceeded threshold.

2. The method as recited in claim 1, wherein multiple data elements are stored in the ring buffer, the sensor data and the item of event information of each individual data element corresponding to a common time of production.

3. The method as recited in claim 2, wherein the multiple data elements are transmitted from the ring buffer to the application unit.

4. The method as recited in claim 1, wherein the sensor data in the sensor module are evaluated by an integrated circuit to form the item of event information.

5. The method as recited in claim 4, wherein the ring buffer is operated in at least two operating modes, and wherein a selection is made between the two operating modes upon request by the application unit.

6. A sensor module, comprising:
    means for producing sensor data, wherein a corresponding item of event information is produced in an evaluation circuit from the sensor data;
    a ring buffer for storing a data element, wherein the data element includes the sensor data and the item of event information; and
    means for transmitting the data element from the ring buffer to an application unit upon request by the application unit, wherein the data element has a first data word length, the sensor data having a second data word length, the first data word length being larger than the second data word length, wherein the item of event information has a third word length, wherein the third word length is a difference between the first data word length and the second data word length, and wherein the item of event information includes at least one of an item of information concerning a triggered sensor axis, a type of an interrupt, and a type of exceeded threshold.

7. A system, comprising:
    a sensor module; and
    an application unit;
    wherein the sensor module: (i) produces sensor data, a corresponding item of event information being produced from the sensor data in an evaluation circuit; (ii) stores a data element in a ring buffer in the sensor module, the data element including the sensor data and the item of event information; and (iii) transmits the data element from the ring buffer to the application unit upon request by the application unit, wherein the data element has a first data word length, the sensor data having a second data word length, the first data word length being larger than the second data word length, wherein the item of information has a third word length, wherein the third word length is a difference between the first data word length and the second data word length, and wherein the item of event information includes at least one of an item of information concerning a triggered sensor axis, a type of an interrupt, and a type of exceeded threshold.

8. The method as recited in claim 1, wherein the type of interrupt includes one of a portrait/landscape changeover, a shake, and a pedometer step number.

9. The sensor module as recited in claim 6, wherein the type of interrupt includes one of a portrait/landscape changeover, a shake, and a pedometer step number.

10. The system as recited in claim 7, wherein the type of interrupt includes one of a portrait/landscape changeover, a shake, and a pedometer step number.

* * * * *